(12) United States Patent
Sekine

(10) Patent No.: US 9,517,784 B2
(45) Date of Patent: Dec. 13, 2016

(54) DRIVING ASSIST UNIT OF TRUCK

(71) Applicant: KAYABA INDUSTRY CO., LTD., Tokyo (JP)

(72) Inventor: Shinichi Sekine, Saitama (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/780,518

(22) PCT Filed: Mar. 26, 2014

(86) PCT No.: PCT/JP2014/058465
§ 371 (c)(1),
(2) Date: Sep. 25, 2015

(87) PCT Pub. No.: WO2014/157309
PCT Pub. Date: Oct. 2, 2014

(65) Prior Publication Data
US 2016/0046310 A1    Feb. 18, 2016

(30) Foreign Application Priority Data

Mar. 26, 2013  (JP) .................................. 2013-064465

(51) Int. Cl.
*B62B 3/00* (2006.01)
*B62B 3/02* (2006.01)
*B62B 5/00* (2006.01)

(52) U.S. Cl.
CPC ............... *B62B 3/02* (2013.01); *B62B 5/0079* (2013.01); *B62B 3/002* (2013.01); *B62B 2207/00* (2013.01)

(58) Field of Classification Search
CPC ..... B62B 5/0079; B62B 3/002; B62B 2207/00
(Continued)

(56) References Cited

U.S. PATENT DOCUMENTS 5,244,047 A * 9/1993 Eudy .................... A01B 59/006
172/275
5,439,069 A * 8/1995 Beeler ................... B62B 3/1404
180/11
(Continued)

FOREIGN PATENT DOCUMENTS

JP     S42-18901 Y1   11/1967
JP     S43-8574 Y1    4/1968
(Continued)

*Primary Examiner* — Tony Winner
*Assistant Examiner* — Marlon A Arce
(74) *Attorney, Agent, or Firm* — Rabin & Berdo, P.C.

(57) ABSTRACT

A driving assist unit of a truck for assisting a driving force applied to the truck by a worker includes a unit body connected to the truck, the unit body being turnable with respect to the truck, an operation portion provided on the unit body, the operation portion being configured to input a driving force to the truck through the unit body by being pressed by the worker, a driving wheel provided on the unit body, the driving wheel being rotatable in a longitudinal direction of the unit body, an assist force according to the operation of the operation portion being applied to the driving wheel, a lower engagement mechanism configured to be engaged with a connecting rod, the connecting being provided protruding to an outside from the truck and perpendicularly with respect to a ground, the lower engagement mechanism being slidable in an axial direction with respect to the connecting rod, and an upper engagement mechanism provided above the lower engagement mechanism and configured to be engaged with the connecting rod, the upper engagement mechanism being slidable in the axial direction with respect to the connecting rod.

4 Claims, 11 Drawing Sheets

(58) Field of Classification Search
USPC ............... 180/19.1, 19.2, 19.3, 14.1, 14.2
See application file for complete search history.

(56) References Cited

U.S. PATENT DOCUMENTS

| | | | | |
|---|---|---|---|---|
| 5,860,485 | A * | 1/1999 | Ebbenga | A47F 10/04 180/19.2 |
| 6,070,679 | A * | 6/2000 | Berg | B62B 3/1404 180/19.2 |
| 7,021,407 | B2 * | 4/2006 | Ruschke | A61G 7/08 180/11 |
| 8,894,086 | B2 * | 11/2014 | Ekbote | B60D 1/02 280/509 |
| 2003/0079923 | A1 * | 5/2003 | Johnson | A61G 7/08 180/19.3 |
| 2006/0102392 | A1 * | 5/2006 | Johnson | A61G 7/08 180/19.1 |
| 2010/0187035 | A1 * | 7/2010 | Lin | B62B 3/001 180/211 |
| 2013/0098698 | A1 * | 4/2013 | Johnson | A47L 11/10 180/65.1 |

FOREIGN PATENT DOCUMENTS

| | | |
|---|---|---|
| JP | 2008-126900 A | 6/2008 |
| JP | 2008-280021 A | 11/2008 |

* cited by examiner

DRIVING ASSIST UNIT OF TRUCK

TECHNICAL FIELD

The present invention relates to a driving assist unit of a truck for assisting a driving force to be applied to the truck by a worker.

BACKGROUND ART

Generally, when a heavy cargo is loaded on a truck used in a factory or the like, the worker needs to push the truck with a large force at start of conveyance, which is a heavy labor.

JP2008-126900A discloses an electric truck provided with a driving device for driving the truck through a connecting member. In this electric truck, the driving device is connected to the truck through the connecting member with one end connected to the truck, the connecting member being capable of swing around a horizontal axis.

SUMMARY OF INVENTION

However, in the electric truck described in JP2008-126900A, if a step is to be ridden over, for example, the driving device makes an arc-shaped motion in a vertical direction using a rear end portion of the truck as a fulcrum. Thus, an attitude of the worker with respect to the driving device might be changed.

The present invention has an object to provide a driving assist unit of a truck capable of assisting driving of the truck without changing the attitude of the worker.

According to an aspect of the present invention, a driving assist unit of a truck, configured to assist a driving force applied to the truck by a worker, includes a unit body connected to the truck, the unit body being turnable with respect to the truck, an operation portion provided on the unit body, the operation portion being configured to input a driving force to the truck through the unit body by being pressed by the worker, a driving wheel provided on the unit body, the driving wheel being rotatable in a longitudinal direction of the unit body, an assist force according to the operation of the operation portion being applied to the driving wheel, a lower engagement mechanism configured to be engaged with a connecting rod, the connecting rod being provided protruding to an outside from the truck and perpendicularly with respect to the ground, the lower engagement mechanism being slidable in an axial direction with respect to the connecting rod, and an upper engagement mechanism provided above the lower engagement mechanism and configured to be engaged with the connecting rod, the upper engagement mechanism being slidable in the axial direction with respect to the connecting rod.

DESCRIPTION OF EMBODIMENTS

A driving assist unit (hereinafter referred to simply as "assist unit") 100 of a truck according to an embodiment of the present invention will be described below by referring to the attached drawings.

First, by referring to FIGS. 1 to 4, a truck 1 to which the assist unit 100 is connected will be explained.

Figure 1:
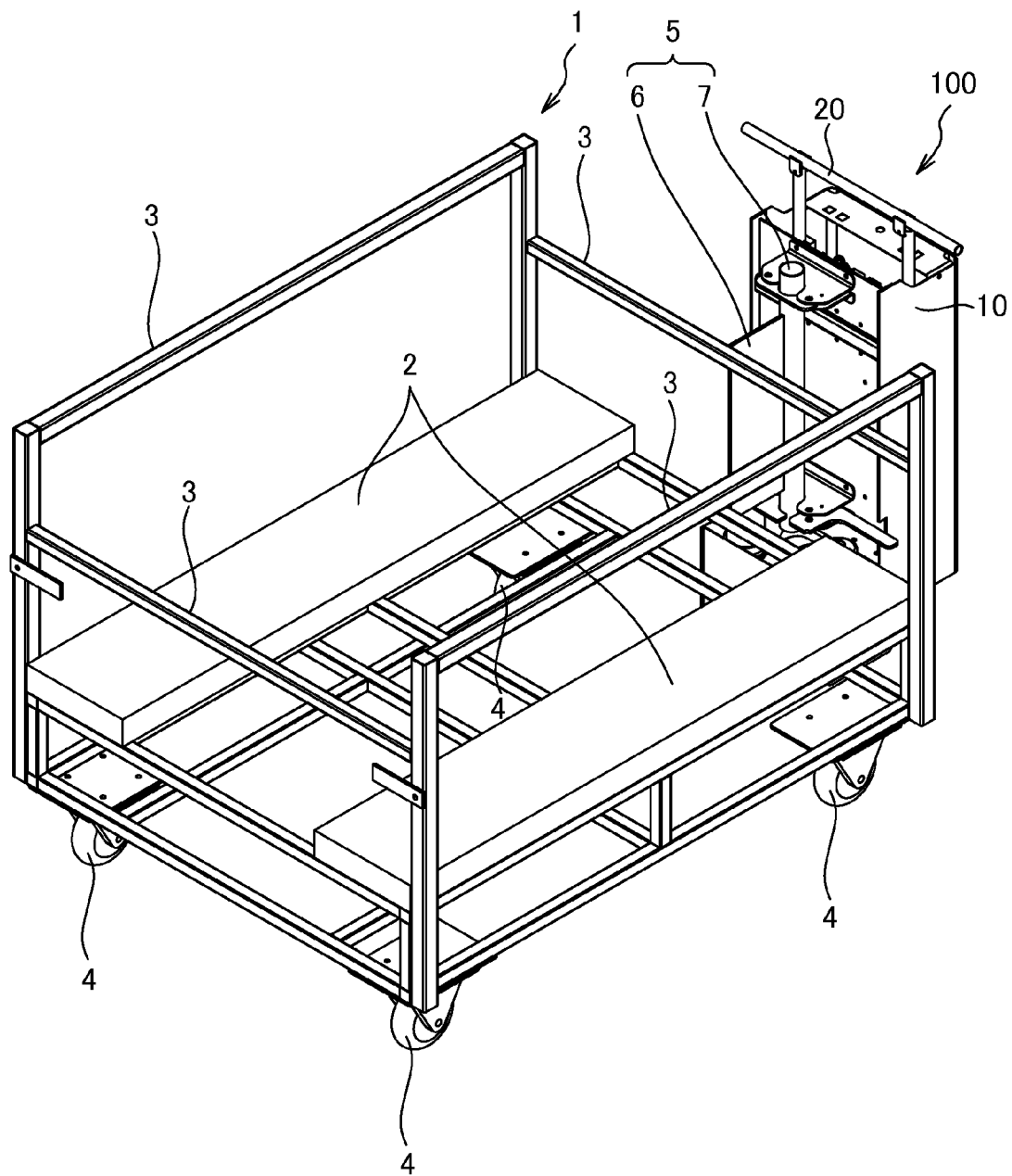
FIG. 1 is a perspective view of a driving assist unit of a truck and the truck according to an embodiment of the present invention.
Figure 2:
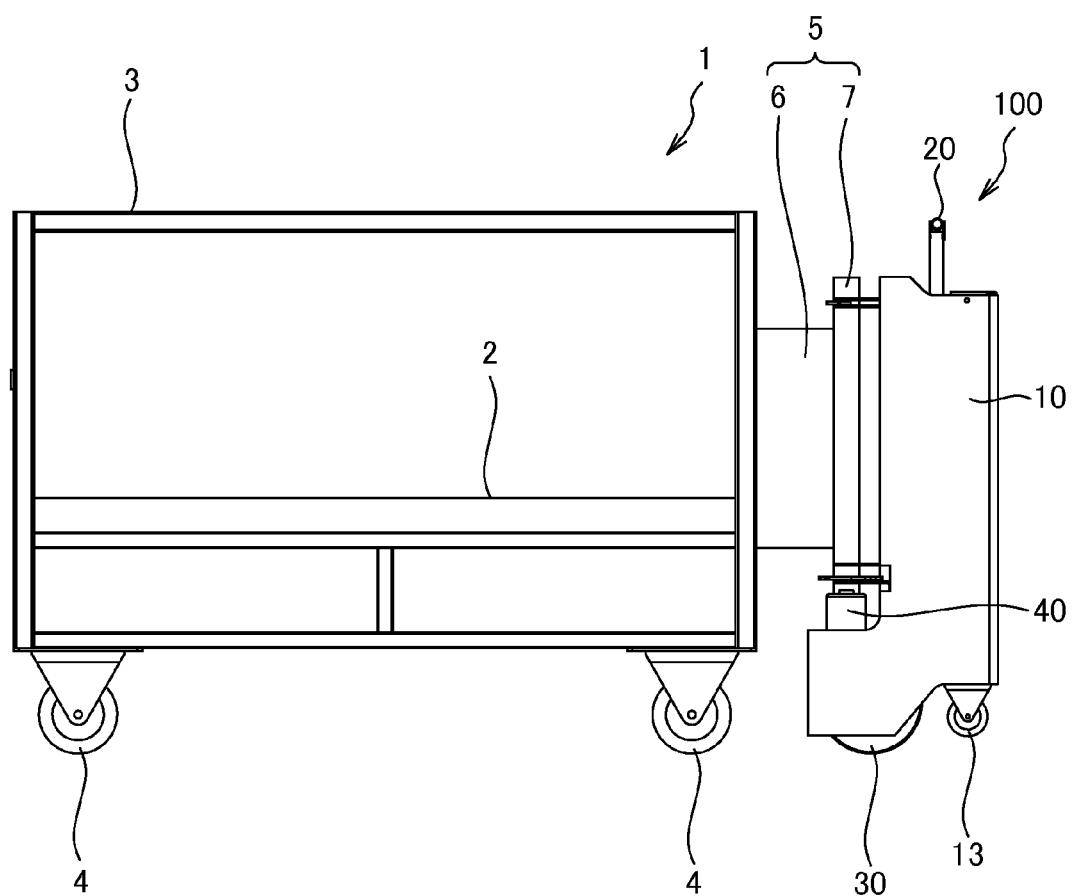
FIG. 2 is a side view in FIG. 1.
Figure 3:
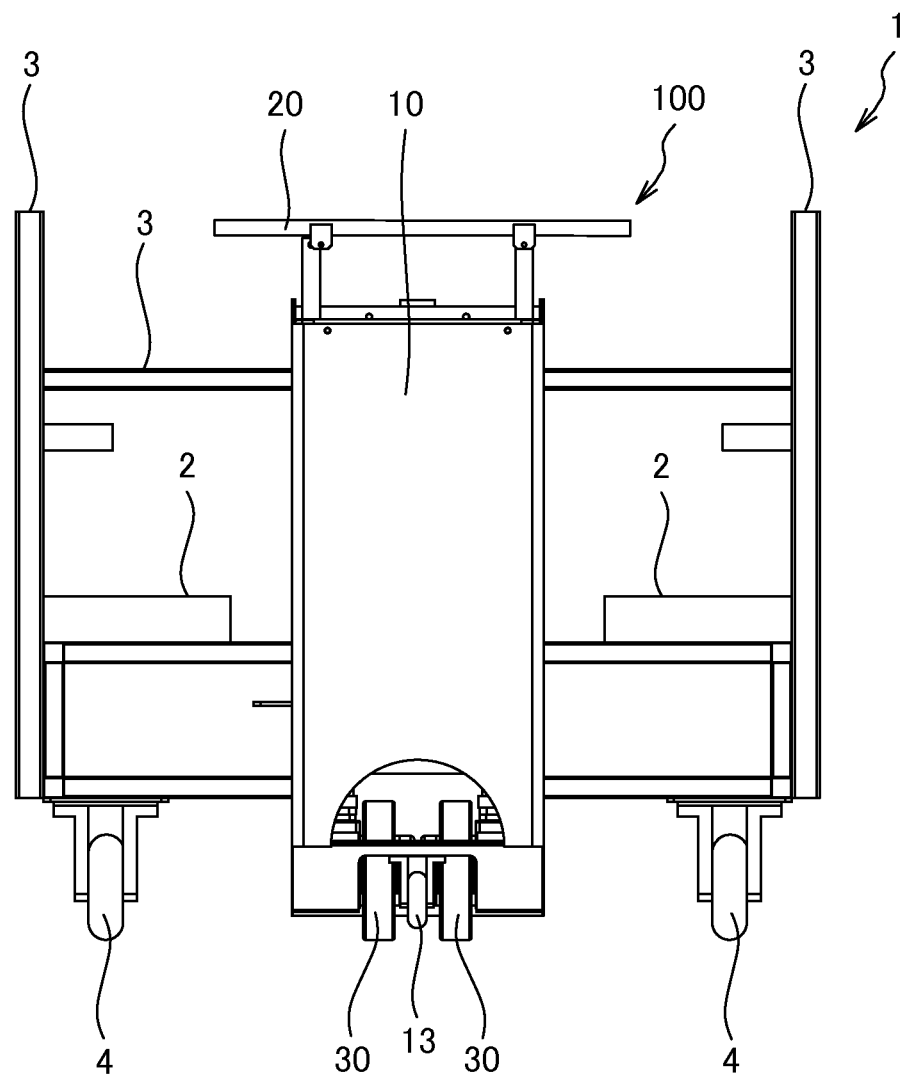
FIG. 3 is a rear view in FIG. 1.
Figure 4:
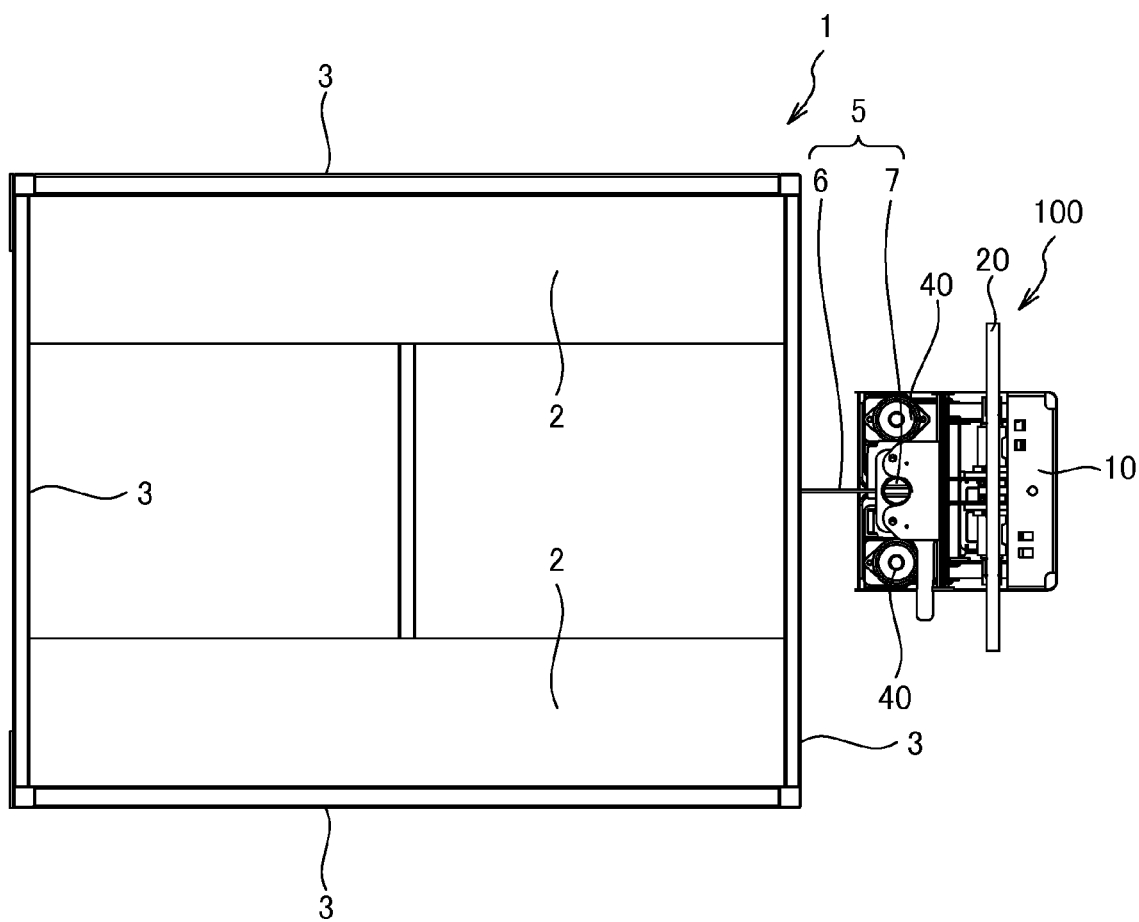
FIG. 4 is a plan view in FIG. 1.

The truck 1 is used for conveying a heavy article in a factory or the like, for example. As illustrated in FIG. 1, the truck 1 is a cage truck having a deck 2 formed having a rectangular shape, standing portions 3 provided vertically upward from four sides of an outer periphery of the deck 2, and four wheels 4 supporting four corner parts of the deck 2, respectively. The truck 1 is movable by rotation of the wheels 4.

Since it is only necessary that the truck 1 can convey a cargo loaded thereon, it is not limited to a cage truck. The truck 1 may be a handcart on which a handle is provided vertically only on one side of the deck 2 or a hand-lift whose deck is elevated up/down by an operation by a worker, for example.

On the deck 2, a cargo is loaded. In this embodiment, the deck 2 is a pair of rectangular plates split right and left. The deck 2 may be a rectangular single plate provided on the whole surface.

The wheels 4 are universal wheels directed toward a traveling direction at all times during traveling. All the four wheels 4 do not have to be universal wheels but a pair of wheels 4 away from the assist unit 100 may be fixed wheels, while only the pair of wheels 4 close to the assist unit 100 may be universal wheels. By setting the pair of wheels 4 away from the assist unit as the fixed wheels as above, straight traveling ability of the truck 1 is improved.

On the truck 1, a connecting member 5 for connecting the assist unit 100 is mounted on the standing portion 3 on a side of the deck 2.

The connecting member 5 has a bracket 6 fixed to the standing portion 3 and a connecting rod 7 provided on a free end of the bracket 6.

The bracket 6 is welded to the standing portion 3. Instead of welding, the bracket 6 may be mounted by bolting. When the bracket 6 is to be bolted to the standing portion 3, the connecting member 5 can be mounted on the truck 1 easily. Moreover, since it is only necessary that the bracket 6 can be bolted, the assist unit 100 can be connected by mounting the connecting member 5 on an existing truck having various shapes.

The connecting rod 7 is a cylindrical rod member provided protruding to an outside from the truck 1 by a length of the bracket 6. The connecting rod 7 is provided perpendicularly to the ground surface. The connecting rod 7 is connected to the truck 1 through the bracket 6 between a position where an upper hook mechanism 11 which will be described later is engaged and a position where a lower hook mechanism 12 is engaged. On the connecting rod 7, the assist unit 100 is mounted. The connecting rod 7 may be a solid round rod having a circular cross section instead of a cylindrical shape.

Figure 5:
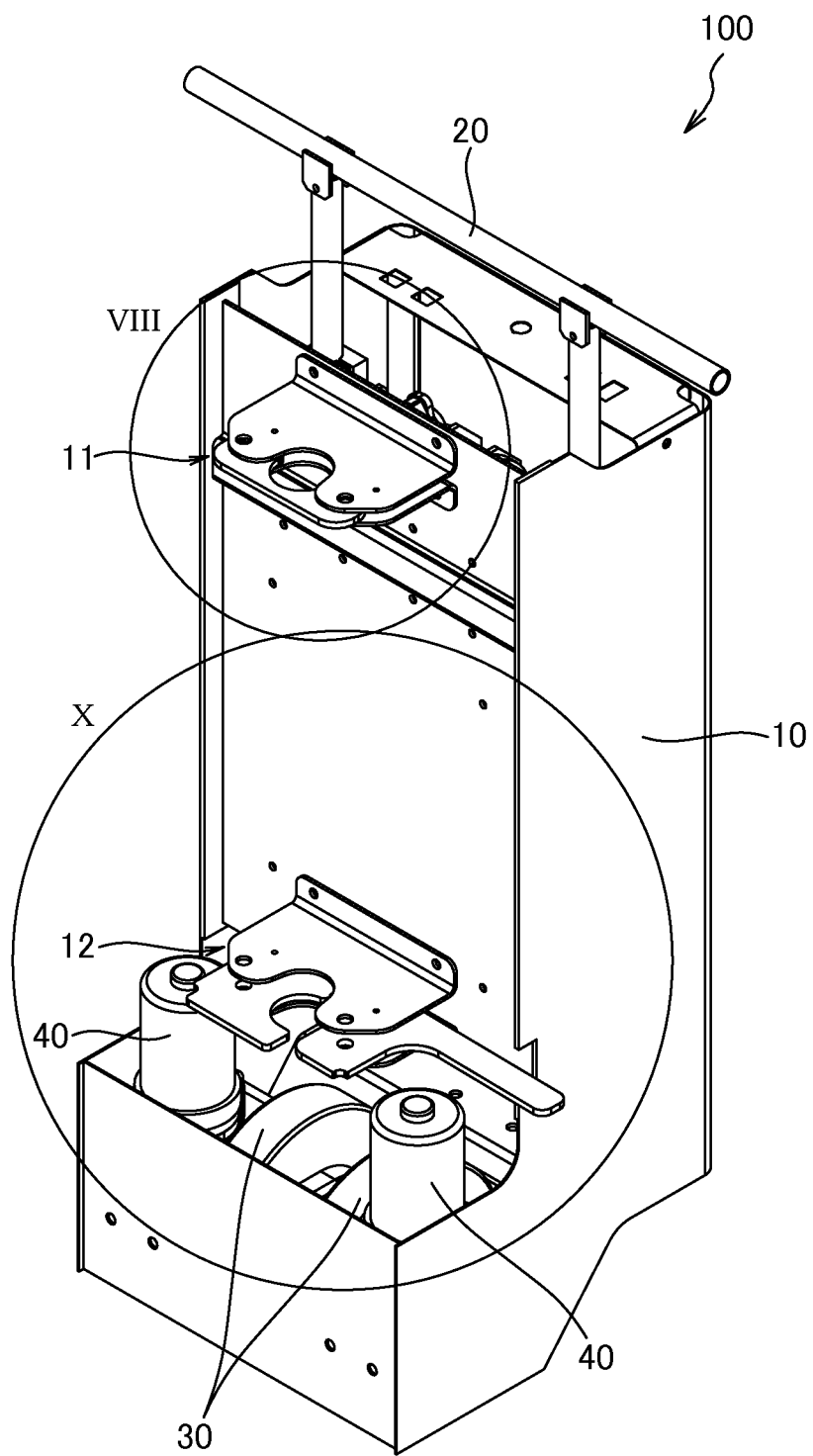
FIG. 5 is a perspective view of the driving assist unit of the truck according to the embodiment of the present invention.

Subsequently, the assist unit 100 will be explained by referring to FIGS. 5 to 7.

The assist unit 100 is to assist the driving force applied to the truck 1 by the worker. The assist unit 100 has a unit body 10 connected to the truck 1, capable of turning, an operation handle 20 as an operation portion capable of inputting a driving force to the truck 1 through the unit body 10 by being pressed by the worker, and driving wheels 30 provided on the unit body 10, rotatably only in a longitudinal direction of the unit body 10 and to which an assist force according to the operation of the operation handle 20 is applied.

The unit body 10 is formed having a vertically long box shape and is supported by the driving wheels 30. The unit body 10 has the upper hook mechanism 11 as an upper engagement mechanism engaged with the connecting rod 7 and the lower hook mechanism 12 as a lower engagement mechanism. Moreover, in the unit body 10, an auxiliary wheel 13 (see FIGS. 6 and 7) not grounded in a state in which the assist unit 100 is connected to the truck 1 is provided.

The upper hook mechanism 11 is to be engaged with the connecting rod 7 manually by the worker. On the other hand, the lower hook mechanism 12 can be engaged with the connecting rod 7 in a single operation only by pressing the assist unit 100 onto the truck 1. The assist unit 100 is connected to the truck 1 by holding of the connecting rod 7 by the upper hook mechanism 11 and the lower hook mechanism 12. The upper hook mechanism 11 and the lower hook mechanism 12 will be explained later in detail by referring to FIGS. 8 to 11.

The auxiliary wheel 13 is a fixed wheel provided away from the driving wheels 30 in a longitudinal direction and rotatable only in the same direction as that of the driving wheels 30. The auxiliary wheel 13 is used by being grounded when the assist unit 100 is removed from the truck 1 and moved as a single body. Specifically, the worker can ground the auxiliary wheel 13 by tilting the assist unit 100 having been removed from the truck 1 longitudinally and can move the assist unit 100 in a state in which three wheels, that is, the pair of driving wheels 30 and the auxiliary wheel 13 are grounded. Thus, stable movement of the assist unit 100 as a single body can be realized.

If the single driving wheel 30 is provided, a pair of the auxiliary wheels 13 is provided. As a result, similarly to the case in which the pair of driving wheels 30 is provided, the assist unit 100 can be stably moved as a single body with the three wheels being grounded.

The operation handle 20 is a handle provided on the unit body 10 and pressed by the worker. The operation handle 20 is a rod material horizontally extended in the right-and-left direction of the unit body 10. The operation handle 20 is connected to an upper part of the unit body 10 on the right and left thereof. As a result, a driving force inputted by operation of the operation handle 20 by the worker is transmitted to the truck 1 through the unit body 10.

The driving wheels 30 are provided unable of being steered and provided toward the longitudinal direction of the unit body 10. The driving wheels 30 are provided in a pair spaced from each other on right and left of the unit body 10. The driving wheels 30 are juxtaposed on right and left by sandwiching a turning center of the unit body 10. In this embodiment, the driving wheels 30 are provided in a pair but instead, the single driving wheel 30 may be provided.

Figure 6:
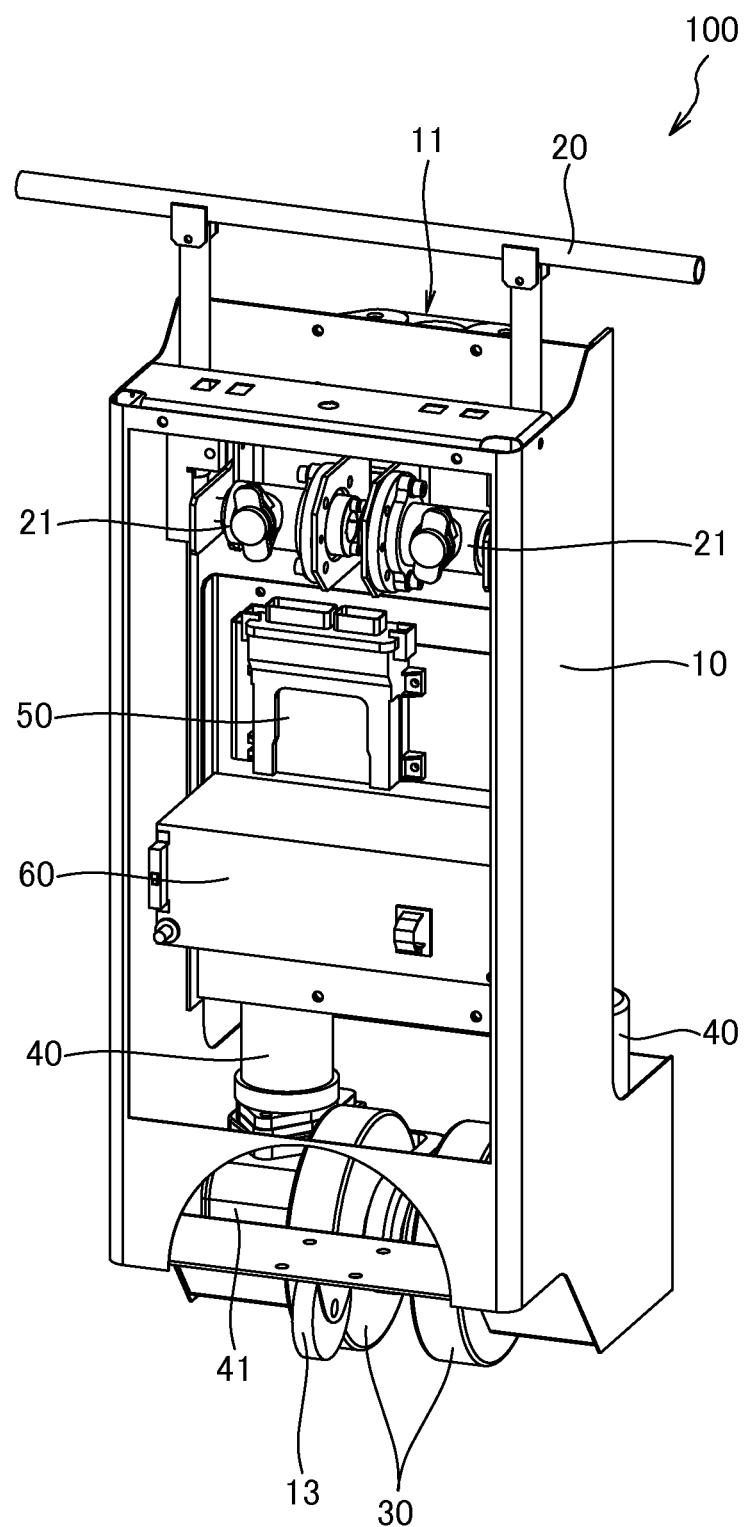
FIG. 6 is a perspective view illustrating an internal structure of the driving assist unit of the truck according to the embodiment of the present invention.
Figure 7:
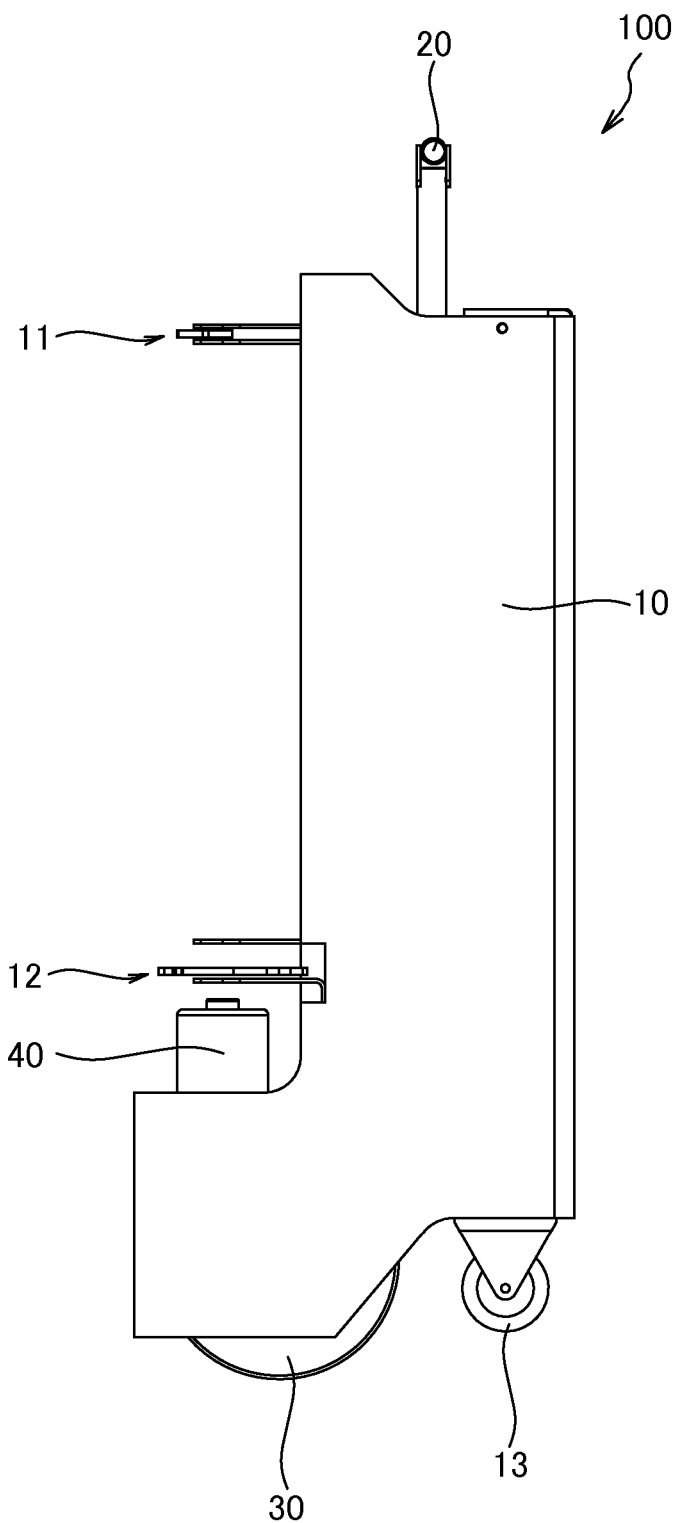
FIG. 7 is a side view in FIG. 5.

Moreover, as illustrated in FIG. 6, the assist unit 100 includes a torque sensor 21 as a torque detection portion for detecting a driving torque inputted from the operation handle 20, an electric motor 40 for applying an assist force according to the driving torque detected by the torque sensor 21 to the driving wheels 30, a controller 50 for controlling the electric motor 40 in accordance with the driving torque detected by the torque sensor 21, and a battery 60 as a power supply device.

The torque sensor 21, the controller 50, the battery 60, and the electric motor 40 are arranged by being vertically arranged in order from the top in the unit body 10. As a result, the assist unit 100 can be formed with a compact shape.

The torque sensors 21 are provided in a pair in the unit body 10 and detect a driving torque inputted to each of the right and left two spots of the unit body 10. The torque sensor 21 is electrically connected to the controller 50 and outputs an electric signal according to the detected driving torque to the controller 50.

The torque sensor 21 includes a torsion bar (not shown) connecting the operation handle 20 to the unit body 10 and twisted by the driving force inputted from the operation handle 20 and also for transmitting the driving force to the unit body 10 and a potentiometer (not shown) for outputting the electric signal according to the torsion of the torsion bar and detects the driving torque on the basis of the torsion of the torsion bar. By changing the torsion bar, operation feeling by the worker can be also changed in accordance with a loaded load of the truck 1 without changing the other members.

The electric motor 40 is electrically connected to the controller 50 and rotated in accordance with the electric signal inputted from the controller 50. The electric motors 40 are provided in a pair and apply an assist force independently to each of the driving wheels 30.

The electric motor 40 is disposed so that its rotating shaft is oriented in a direction perpendicular to the ground. The electric motor 40 is provided outside of each of the pair of driving wheels 30. As a result, an interval between the pair of driving wheels 30 can be made small. Thus, a rotation radius of the driving wheel 30 is made small, and a moment required for the worker to rotate the assist unit 100 can be made small. Therefore, handling of the assist unit 100 by the worker is facilitated.

Between the driving wheel 30 and the electric motor 40, a warm transmission 41 as a transmission for reducing a speed of the rotation of the electric motor 40 and for changing a rotating direction and transmitting it to the driving wheel 30 is provided.

The controller 50 is mounted on the unit body 10. The controller 50 is for controlling the assist unit 100 and is constituted by a microcomputer provided with a CPU (Central Processing Unit), a ROM (Read Only Memory), a RAM (Random Access Memory), and an I/O interface (input/output interface). The RAM stores data in processing of the CPU, the ROM stores a control program of the CPU and the like in advance, and the I/O interface is used for input/output of information with respect to connected devices. By operating the CPU, the RAM and the like in accordance with a program stored in the ROM, control of the assist unit 100 is realized.

The controller 50 controls each of the right and left electric motors 40 in accordance with each of the driving torques detected by the right and left torque sensors 21 and applies an assist force to the right and left driving wheels 30. Specifically, the controller 50 controls the left-side electric motor 40 in accordance with the driving torque detected by the left-side torque sensor 21 and controls the right-side electric motor 40 in accordance with the driving torque detected by the right-side torque sensor 21. As a result, an assist force for advancing and retreating as well as linearly advancing, turning around or turning the assist unit 100 is applied.

The battery 60 is mounted on the unit body 10. The battery 60 is a battery cell for driving the controller 50 and for supplying a DC power to the electric motor 40 on the basis of control by the controller 50.

Subsequently, the upper hook mechanism 11 and the lower hook mechanism 12 will be explained by referring to FIGS. 8 to 11.

The upper hook mechanism 11 is provided above the lower hook mechanism 12. The upper hook mechanism 11 is engaged slidably in an axial direction with respect to the connecting rod 7. The upper hook mechanism 11 can be engaged with the truck 1 through the connecting rod 7 by a pin 16 as a locking member fitted by the worker.

Figure 8:
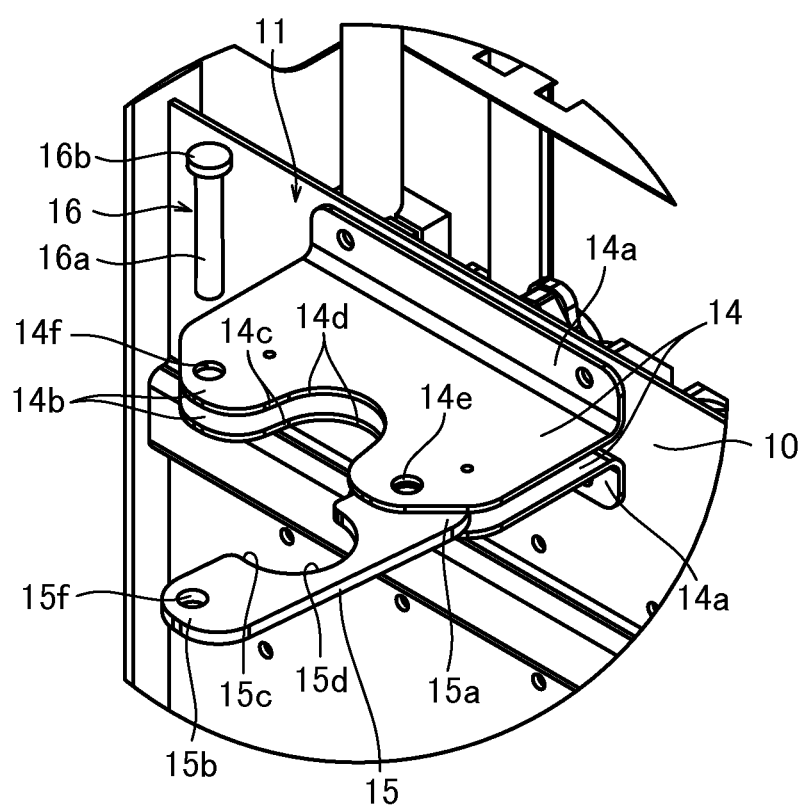
FIG. 8 is an enlarged view of a VIII part in FIG. 5 and illustrates a state in which an upper engagement mechanism is not engaged with a connecting rod.

The upper hook mechanism 11 has, as illustrated in FIG. 8, a fixed portion 14 fixed to the unit body 10 and with which a side surface of the connecting rod 7 is brought into contact, a movable portion 15 provided rotatably with respect to the fixed portion 14 and fixed to the fixed portion 14 by the pin 16 fitted in a state in which the connecting rod 7 is sandwiched between the fixed portion 14 and itself, and the pin 16 fitted by the worker.

The fixed portion 14 is a plate having a base end 14a mounted on the unit body 10 and provided protruding from the unit body 10. The fixed portions 14 are provided in a pair by being juxtaposed vertically in parallel. On a free end 14b of the fixed portion 14, a recess portion 14c having an arc portion 14d formed having a shape corresponding to an outer shape of the connecting rod 7 is formed.

The fixed portion 14 has a through hole 14e formed on one end of the recess portion 14c and in which the movable portion 15 is mounted rotatably and a through hole 14f formed on the other end of the recess portion 14c and into which the pin 16 can be inserted in a state in which the movable portion 15 sandwiches the connecting rod 7 between the fixed portion 14 and the movable portion 15.

The movable portion 15 is a plate having a base end 15a rotatably mounted on the through hole 14e of the fixed portion 14. The movable portion 15 is located between the pair of fixed portions 14. In the movable portion 15, a recess portion 15c having an arc portion 15d formed to be faced with the recess portion 14c of the fixed portion 14 in a state in which the connecting rod 7 is sandwiched between the fixed portion 14 and the movable portion 15 and formed having a shape corresponding to the outer shape of the connecting rod 7.

In a free end 15b of the movable portion 15, a through hole 15f coaxial with the through hole 14e of the fixed portion 14 in a state in which the connecting rod 7 is sandwiched between the fixed portion 14 and the movable portion 15 is formed.

The pin 16 has a shaft part 16a inserted into the through hole 14f and the through hole 15f and a head part 16b formed with a diameter larger than that of the shaft part 16a. The shaft part 16a is formed having a diameter smaller than those of the through hole 14f and the through hole 15f, and the head part 16b is formed having a diameter larger than those of the through hole 14f and the through hole 15f.

Figure 9:
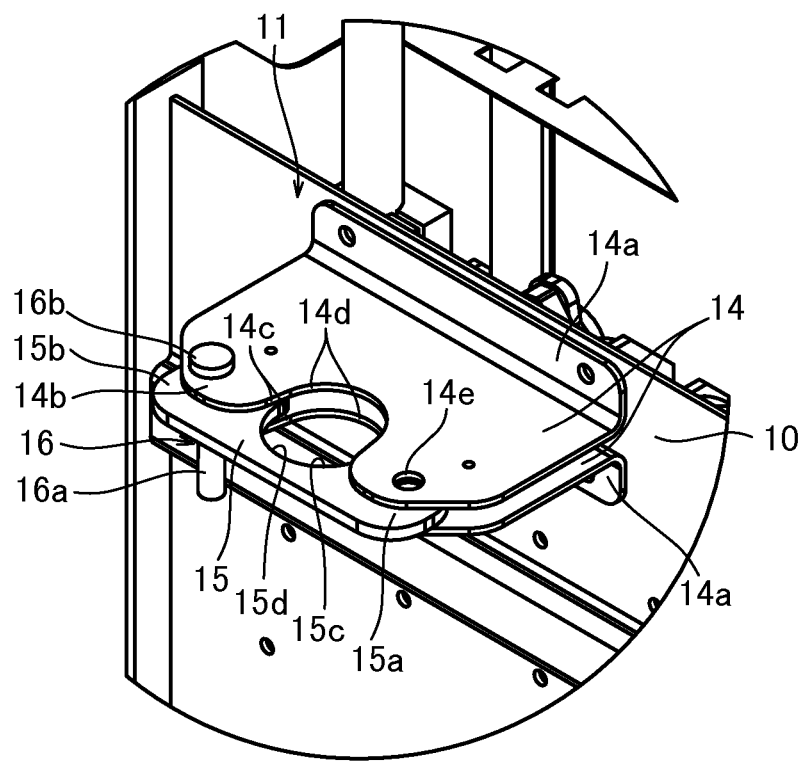
FIG. 9 is a view illustrating a state in which the upper engagement mechanism is engaged with the connecting rod in FIG. 8.

Regarding the pin 16, as illustrated in FIG. 9, the shaft part 16a is inserted from above the through hole 14f and the through hole 15f in a state in which the connecting rod 7 is sandwiched between the fixed portion 14 and the movable portion 15. As a result, the movable portion 15 is fixed unable of rotation with respect to the fixed portion 14. The position of the pin 16 in an axial direction is defined by the head part 16b brought into contact with the upper fixed portion 14.

On the other hand, when the pin 16 is pulled upward out of the through hole 14f and the through hole 15f, as illustrated in FIG. 8, the movable portion 15 is made rotatable with respect to the fixed portion 14.

The lower hook mechanism 12 is provided below the upper hook mechanism 11. The lower hook mechanism 12 is engaged slidably in the axial direction with respect to the connecting rod 7. The lower hook mechanism 12 can be engaged with the truck 1 through the connecting rod 7 by pressing the unit body 10 onto the truck 1.

Figure 10:
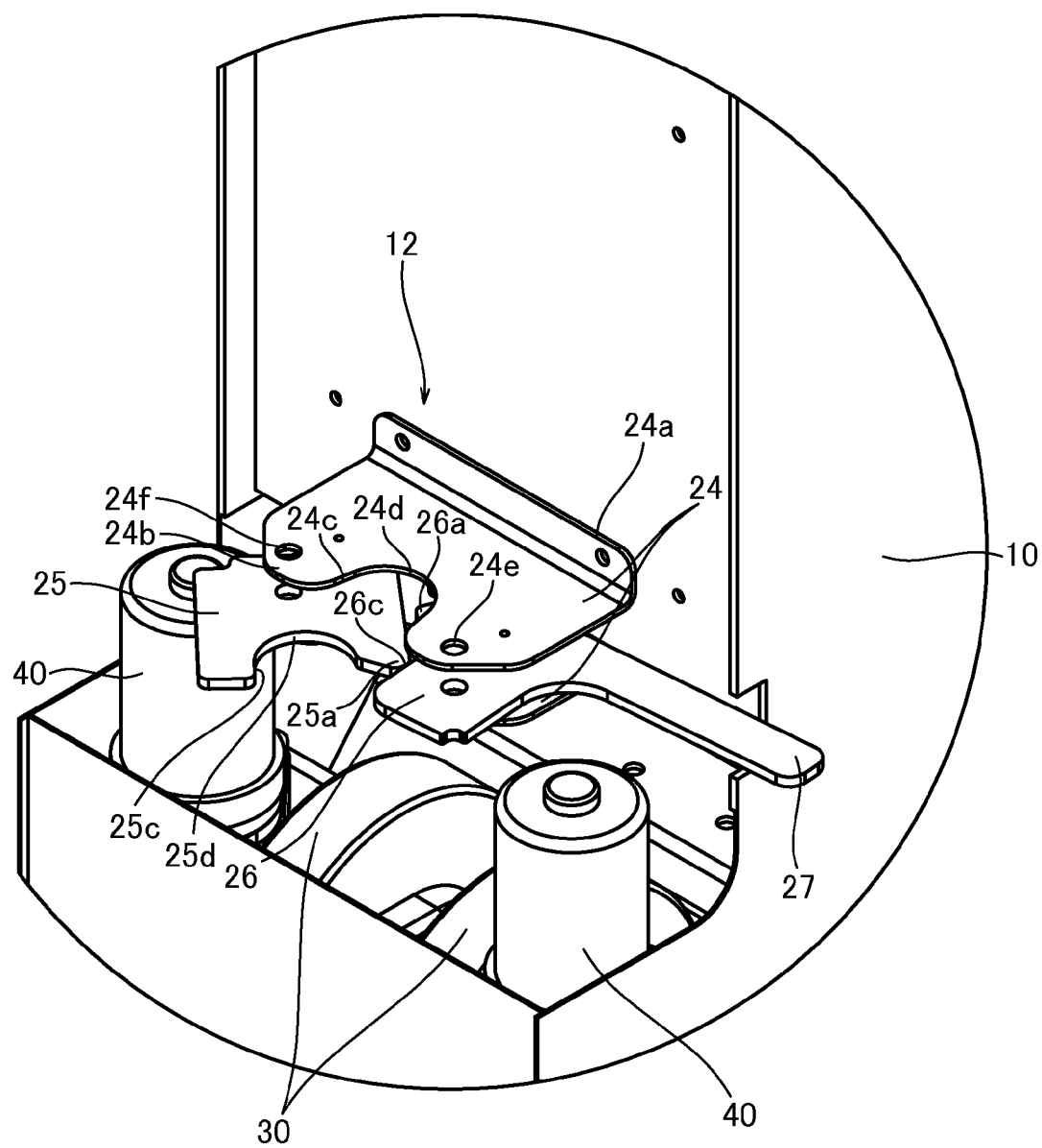
FIG. 10 is an enlarged view of an X part in FIG. 5 and illustrates a state in which a lower engagement mechanism is not engaged with the connecting rod.
Figure 11:
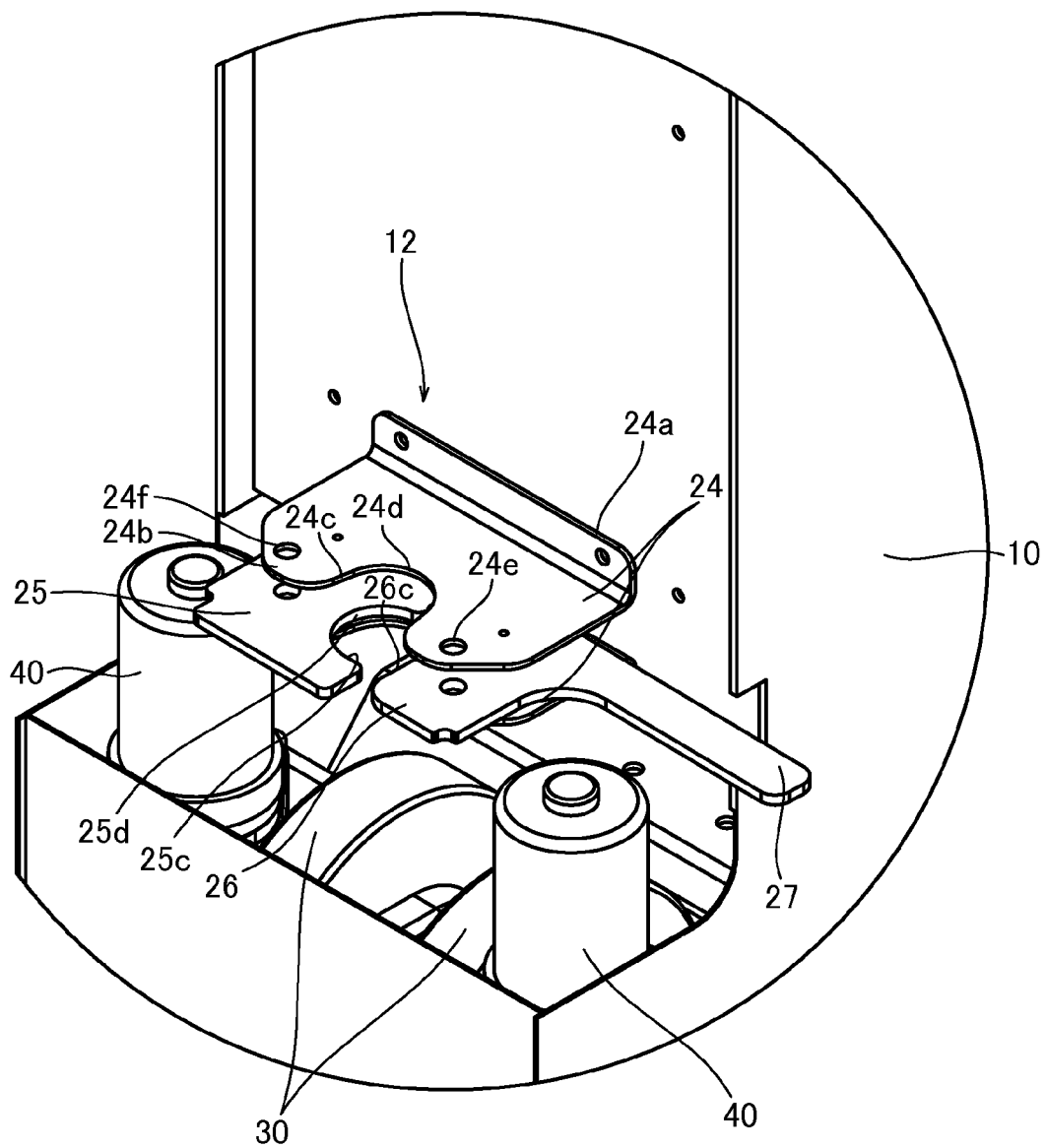
FIG. 11 is a view illustrating a state in which the lower engagement mechanism is engaged with the connecting rod in FIG. 10.

The lower hook mechanism 12 has, as illustrated in FIG. 10, a fixed portion 24 fixed to the unit body 10 and having a recess portion 24c into which the connecting rod 7 enters, a first movable portion 25 provided rotatably with respect to one end of the recess portion 24c in a free end 24b of the fixed portion 24, a second movable portion 26 provided rotatably with respect to the other end of the recess portion 24c in the free end 24b of the fixed portion 24, and a release lever 27 provided protruding to an outside from the unit body 10 and operated by the worker.

The fixed portion 24 is a plate having a base end 24a mounted on the unit body 10 and provided protruding from the unit body 10. The fixed portions 24 are provided in a pair by being juxtaposed vertically in parallel. On a free end 24b of the fixed portion 24, a recess portion 24c having an arc portion 24d formed having a shape corresponding to an outer shape of the connecting rod 7 is formed.

The fixed portion 24 has a through hole 24f formed on one end of the recess portion 24c and on which the first movable portion 25 is mounted rotatably and a through hole 24e formed on the other end of the recess portion 24c and on which the second movable portion 26 is mounted rotatably.

The first movable portion 25 is a plate rotatably mounted on the through hole 24f of the fixed portion 24. The first movable portion 25 is located between the pair of fixed portions 24. The first movable portion 25 is rotated by being pressed by the connecting rod 7 when the connecting rod 7 enters into the recess portion 24c and thus the recess portion 24c is closed and the connecting rod 7 is sandwiched.

On the first movable portion 25, a recess portion 25c having an arc portion 25d formed having a shape corresponding to an outer shape of the connecting rod 7 and in sliding contact with the connecting rod 7 when the connecting rod 7 enters into the recess portion 24c and an engagement portion 25a engaged with the second movable portion 26 are formed.

The first movable portion 25 is rotated by being pressed by the connecting rod 7 in a state in which the connecting rod 7 is brought into contact with the recess portion 25c when the connecting rod 7 enters into the recess portion 24c. As a result, the recess portion 25c is located coaxially with the recess portion 24c, and the connecting rod 7 is sandwiched by the fixed portion 24 and the first movable portion 25.

The engagement portion 25a is brought into sliding contact with a sandwiching portion 26c of the second movable portion 26 when the first movable portion 25 is rotated. The engagement portion 25*a* is locked by an engagement projection portion 26*a* of the second movable portion 26 in a state in which the first movable portion 25 is rotated and the recess portion 25*c* is located coaxially with the recess portion 24*c*. As a result, the first movable portion 25 is fixed incapable of rotation.

The second movable portion 26 is a plate rotatably mounted on the through hole 24*e* of the fixed portion 24. The second movable portion 26 is located between the pair of fixed portions 24. The second movable portion 26 has the engagement projection portion 26*a* engaged with and fixing the first movable portion 25 in the state sandwiching the connecting rod 7 and the sandwiching portion 26*c* for sandwiching the connecting rod 7 between the recess portion 25*c* and the sandwiching portion 26*c*.

The engagement projection portion 26*a* is pressed by the engagement portion 25*a* of the first movable portion 25 when the connecting rod 7 enters into the recess portion 24*c*. Then, when the second movable portion 26 is rotated, the engagement portion 25*a* of the first movable portion 25 rides over the engagement projection portion 26*a*. As a result, the engagement projection portion 26*a* locks the engagement portion 25*a* and fixes the first movable portion 25 (state illustrated in FIG. 11).

The release lever 27 is provided integrally with the second movable portion 26. The release lever 27 is operated by the worker when the engagement of the lower hook mechanism 12 with the connecting rod 7 is to be released.

When the release lever 27 is operated by the worker in a direction separated away from the unit body 10, the second movable portion 26 is rotated integrally with the release lever 27, and the engagement between the engagement projection portion 26*a* and the engagement portion 25*a* is released. As a result, fixing of the first movable portion 25 is released and made rotatable, and the connecting rod 7 can be separated away from the recess portion 24*c* of the fixed portion 24.

As described above, when the unit body 10 of the assist unit 100 is pressed onto the truck 1, the lower hook mechanism 12 is engaged with the truck 1 through the connecting rod 7. Then, when the pin 16 of the upper hook mechanism 11 is fitted by the worker, the upper hook mechanism 11 is engaged with the truck 1 through the connecting rod 7. The upper hook mechanism 11 is provided above the lower hook mechanism 12 and is located at a relatively high position. Thus, an operation of fitting the pin 16 by the worker is easy. Therefore, the connection between the assist unit 100 and the truck 1 can be made easily.

Moreover, even if the release lever 27 of the lower hook mechanism 12 is operated by contact with an obstacle outside against an intension of the worker and engagement of the lower hook mechanism 12 with the connecting rod 7 is released, for example, the engagement of the upper hook mechanism 11 with the connecting rod 7 is maintained. As described above, since the upper hook mechanism 11 and the lower hook mechanism 12 are given different structures, the connection of the assist unit 100 with the truck 1 can be made reliably.

Subsequently, an action of the assist unit 100 will be explained by referring to FIGS. 1 to 4.

First, a case in which the truck 1 is to be advanced or retreated linearly through the assist unit 100 will be explained. Here, an instance in which the assist unit 100 pushes the truck 1 is referred to as advance, while an instance in which the truck 1 is towed is referred to as retreat.

When the worker pushes the operating handle 20 with both hands in parallel, the assist unit 100 linearly advances the truck 1. In this case, the driving force inputted into the unit body 10 as the operation handle 20 is pushed is substantially the same on both right and left ends of the operation handle 20. Thus, the driving torque detected by the right and left torque sensors 21 are substantially the same.

When the right and left torque sensors 21 detect the same driving torque, the controller 50 instructs to apply the same assist force to the right and left driving wheels 30 from the right and left electric motors 40. As a result, the same assist force is applied to the right and left driving wheels 30.

Therefore, the assist unit 100 can linearly advance the truck 1 while it is faced with the same direction as the truck 1 without turning since the assist force of the electric motor 40 is applied to the driving force applied by the worker.

At this time, the upper hook mechanism 11 and the lower hook mechanism 12 are engaged slidably in an axial direction with the connecting rod 7 provided protruding to an outside from the truck 1 and perpendicularly with respect to the ground. Thus, the assist unit 100 can move vertically with respect to the truck 1 by sliding of the upper hook mechanism 11 and the lower hook mechanism 12 with respect to the connecting rod 7. Thus, if a step is to be ridden over, for example, the assist unit 100 only moves vertically without changing an attitude. Therefore, the driving of the truck 1 can be assisted without changing an attitude of the worker.

When the truck 1 is to be linearly retreated, the direction in which the operation handle 20 is pushed becomes the opposite, and only the rotating direction of the electric motor 40 becomes opposite, while the other actions are the same as those of the case of linear advancement.

Subsequently, a case in which the truck 1 is turned/made to travel through the assist unit 100 will be explained.

If the worker wants to differentiate the forces on the right and left used for pushing the operation handle 20, the assist unit 100 is turned/made to travel to left or right. At this time, the assist force applied to the right and left driving wheels 30 is different between the right and left electric motors 40.

Specifically, when the truck 1 is to be turned in the left direction, for example, the force for pushing the operation handle 20 with the right hand by the worker becomes larger than the force for pushing the operation handle 20 with the left hand. Thus, the driving torque detected by the right-side torque sensor 21 becomes larger than the driving torque detected by the left-side torque sensor 21.

The controller 50 gives an instruction that the assist force to be applied to the driving wheel 30 from the right-side electric motor 40 becomes larger than the assist force to be applied to the driving wheel 30 from the left-side electric motor 40. As a result, the assist force applied to the right-side driving wheel 30 becomes larger than the assist force applied to the left-side driving wheel 30.

Thus, the assist unit 100 is brought into a state of turning with respect to the truck 1. As described above, the assist unit 100 can apply not only the assist force for advancing or retreating the truck 1 but also a moment for turning the truck 1. Therefore, the assist unit 100 can turn/make the truck 1 run as the assist force of the electric motor 40 is applied to the driving force applied by the worker.

At this time, too, the assist unit 100 can move vertically with respect to the truck 1 by sliding of the upper hook mechanism 11 and the lower hook mechanism 12 with respect to the connecting rod 7 similarly to the advance and retreat. Thus, if a step is to be ridden over, for example, the assist unit 100 only moves vertically without changing the attitude. Therefore, it can assist driving of the truck 1 without changing the attitude of the worker.

The unit body 10 is connected to the truck 1, capable of turning. Moreover, the driving wheels 30 are provided on the unit body 10 rotatably only in the longitudinal direction. Thus, since the driving wheels 30 do not turn with respect to the unit body 10, a mechanism for turning the driving wheels 30 is not necessary. Therefore, a structure of the assist unit 100 of the truck 1 can be simplified.

Moreover, if a heavy article is loaded on the truck 1, the truck 1 can be moved by applying the assist force from the assist unit 100 on the basis of the operation of the worker. On the other hand, if a cargo mounted on the truck 1 is light or there is no cargo, the truck 1 can be moved only by the driving force by the worker without applying the assist force from the assist unit 100.

The right and left torque sensors 21 can detect a driving torque continuously and thus, magnitude of the assist force can be controlled in accordance with the force for pressing the operation handle 20 by the worker.

According to the above embodiment, the following effects are exerted.

The upper hook mechanism 11 and the lower hook mechanism 12 are engaged slidably in an axial direction with the connecting rod 7 provided protruding to an outside from the truck 1 and perpendicularly with respect to the ground. Thus, the assist unit 100 can move vertically with respect to the truck 1 by sliding of the upper hook mechanism 11 and the lower hook mechanism 12 with respect to the connecting rod 7. Thus, if a step is to be ridden over, for example, the assist unit 100 only moves vertically without changing an attitude. Therefore, the driving of the truck 1 can be assisted without changing an attitude of the worker.

Although an embodiment of the present invention has been described, the embodiment is merely one of application examples of the present invention and by no means limits the technical scope of the present invention to a specific configuration of the above-mentioned embodiment.

This application claims priority to Japanese Patent Application No. 2013-064465 filed in the Japanese Patent Office on Mar. 26, 2013, the entire contents of which are incorporated by reference herein.

The invention claimed is:

1. A driving assist unit of a truck, configured to assist a driving force applied to the truck by a worker, comprising:
    a unit body connected to the truck, the unit body being turnable with respect to the truck;
    an operation portion provided on the unit body, the operation portion being configured to input a driving force to the truck through the unit body by being pressed by the worker;
    a driving wheel provided on the unit body, the driving wheel being rotatable in a longitudinal direction of the unit body, an assist force according to the operation of the operation portion being applied to the driving wheel;
    a lower engagement mechanism configured to be engaged with a connecting rod, the connecting rod being provided protruding to an outside from the truck and perpendicularly with respect to a ground, the lower engagement mechanism being slidable in an axial direction with respect to the connecting rod; and
    an upper engagement mechanism provided above the lower engagement mechanism and configured to be engaged with the connecting rod, the upper engagement mechanism being slidable in the axial direction with respect to the connecting rod, wherein
    the lower engagement mechanism is configured to be engaged with the truck by pressing the unit body onto the truck; and
    the upper engagement mechanism is configured to be engaged with the truck by fitting of a locking member by the worker.

2. The driving assist unit of the truck according to claim 1, wherein
    the upper engagement mechanism has:
    a fixed portion fixed to the unit body and brought into contact with a side surface of the connecting rod; and
    a movable portion provided rotatably with respect to the fixed portion and fixed to the fixed portion by fitting of the locking member in a state in which the connecting rod is sandwiched between the fixed portion and the movable portion.

3. The driving assist unit of the truck according to claim 1, wherein
    the lower engagement mechanism has:
    a fixed portion fixed to the unit body and having a recess portion into which the connecting rod enters;
    a first movable portion provided rotatably with respect to one end of the recess portion of the fixed portion and configured to rotate when the connecting rod enters into the recess portion, to close the recess portion by being pressed by the connecting rod and to sandwich the connecting rod; and
    a second movable portion provided rotatably with respect to the other end of the recess portion in the fixed portion and configured to be engaged with and fix the first movable portion in the state in which the connecting rod is sandwiched.

4. The driving assist unit of the truck according to claim 1, wherein
    the connecting rod is connected to the truck between a position where the upper engagement mechanism is engaged and a position where the lower engagement mechanism is engaged.

* * * * *